United States Patent
Chou et al.

(10) Patent No.: US 10,860,150 B1
(45) Date of Patent: Dec. 8, 2020

(54) TOUCH SYSTEM, OPERATION METHOD, AND NON-TRANSITORY COMPUTER READABLE STORAGE MEDIUM

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Hsien-Ying Chou, Guangdong (CN); Chun-Ta Chen, Guangdong (CN); Chih-Lin Liao, Guangdong (CN); Fu-Cheng Wei, Guangdong (CN); Fu-Chiang Chuang, Guangdong (CN); Pi-Tsang Chang, Guangdong (CN)

(73) Assignees: INTERFACE TECHNOLOGY (CHENGDU) CO., LTD., Sichuan (CN); INTERFACE OPTOELECTRONICS (SHENZHEN) CO., LTD., Guangdong (CN); GENERAL INTERFACE SOLUTION LIMITED, Miaoli County (TW)

( * ) Notice: Subject to any disclaimer, the term of this patent is extended or adjusted under 35 U.S.C. 154(b) by 0 days.

(21) Appl. No.: 16/513,741

(22) Filed: Jul. 17, 2019

(30) Foreign Application Priority Data

Jun. 4, 2019 (CN) .......................... 2019 1 0481293

(51) Int. Cl.
*G06F 3/044* (2006.01)

(52) U.S. Cl.
CPC .................................. *G06F 3/044* (2013.01)

(58) Field of Classification Search
CPC ....................................................... G06F 3/044
See application file for complete search history.

(56) References Cited

U.S. PATENT DOCUMENTS

2016/0291796 A1* 10/2016 Ho ........................ G06F 1/1656

* cited by examiner

*Primary Examiner* — Gustavo Polo
(74) *Attorney, Agent, or Firm* — CKC & Partners Co., LLC

(57) ABSTRACT

A touch system includes a processor and a touch array. The touch array includes touch units. Each of the touch units includes a driving electrode, a first sensing electrode, and a second sensing electrode. A first capacitor is formed between the first sensing electrode and the driving electrode. A second capacitor is formed between the second sensing electrode and the driving electrode. The processor is configured to: determine whether the touch array operates in an underwater mode according to the first original capacitance value and the second original capacitance value; determine whether a conductor touch event occurs according to a first threshold value and a voltage across the first capacitor when the touch array operates in the underwater mode; and determine whether a non-conductor touch event occurs according to a second threshold value and a voltage across the second capacitor when the touch array operates in the underwater mode.

13 Claims, 8 Drawing Sheets

TOUCH SYSTEM, OPERATION METHOD, AND NON-TRANSITORY COMPUTER READABLE STORAGE MEDIUM

RELATED APPLICATIONS

This application claims priority to Chinese Application Serial Number 201910481293.2, filed Jun. 4, 2019, which is herein incorporated by reference.

BACKGROUND

Technical Field

The present disclosure relates to touch technology. More particularly, the present disclosure relates to a touch system, an operation method, and non-transitory computer readable storage medium being suitable for implementing an underwater touch function.

Description of Related Art

With development of touch technology, more and more electronic devices have touch functions. However, current touch technology is almost for touch events in the air. How to expand the application environment of the touch functions is an important issue.

SUMMARY

One embodiment of the present disclosure is related to a touch system. The touch system includes a processor and a touch array. The touch array includes a plurality of touch units. Each of the touch units includes a driving electrode, a first sensing electrode, and a second sensing electrode. A first capacitor is formed between the first sensing electrode and the driving electrode. The first capacitor has a first original capacitance value. A second capacitor is formed between the second sensing electrode and the driving electrode. The second capacitor has a second original capacitance value. The processor is configured to: determine whether the touch array operates in an underwater mode or not according to the first original capacitance value and the second original capacitance value; determine whether a conductor touch event occurs or not according to a first threshold value and a voltage across the first capacitor when the touch array operates in the underwater mode; and determine whether a non-conductor touch event occurs or not according to a second threshold value and a voltage across the second capacitor when the touch array operates in the underwater mode.

One embodiment of the present disclosure is related to an operation method of a touch system. The touch system includes a touch array. The touch array includes a plurality of touch units. Each of the touch units includes a driving electrode, a first sensing electrode, and a second electrode. A first capacitor is formed between the first sensing electrode and the driving electrode. The first capacitor has a first original capacitance value. A second capacitor is formed between the second sensing electrode and the driving electrode. The second capacitor has a second original capacitance value. The operation method includes: determining, by a processor, whether the touch array operates in an underwater mode or not according to the first original capacitance value and the second original capacitance value; determining, by the processor, whether a conductor touch event occurs or not according to a first threshold value and a voltage across the first capacitor when the touch array operates in the underwater mode; and determining, by the processor, whether a non-conductor touch event occurs or not according to a second threshold value and a voltage across the second capacitor when the touch array operates in the underwater mode.

One embodiment of the present disclosure is related to a non-transitory computer readable storage medium. The non-transitory computer readable storage medium stores one or more programs. The one or more programs include instructions. A processor of a touch system is configured to execute the instructions. The touch system includes a touch array. The touch array includes a plurality of touch units. Each of the touch units includes a driving electrode, a first sensing electrode, and a second sensing electrode. A first capacitor is formed between the first sensing electrode and the driving electrode. The first capacitor has a first original capacitance value. A second capacitor is formed between the second sensing electrode and the driving electrode. The second capacitor has a second original capacitance value. When the processor executes the instructions, the processor executes following steps: determining whether the touch array operates in an underwater mode or not according to the first original capacitance value and the second original capacitance value; determining whether a conductor touch event occurs or not according to a first threshold value and a voltage across the first capacitor when the touch array operates in the underwater mode; and determining whether a non-conductor touch event occurs or not according to a second threshold value and a voltage across the second capacitor when the touch array operates in the underwater mode.

As the above embodiments, the touch system and the operation method of the touch system of the present disclosure are able to implement the underwater touch function.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
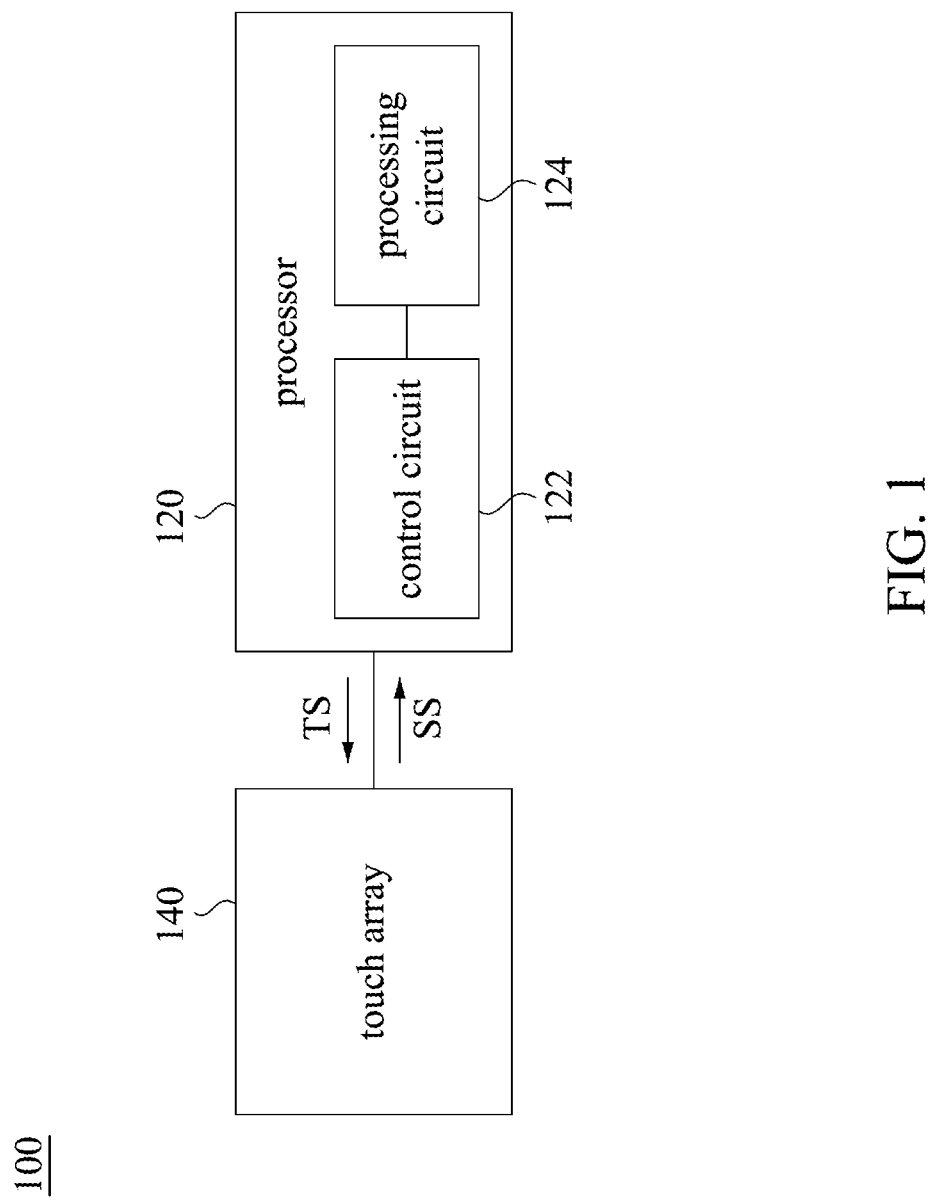
FIG. 1 is a schematic diagram illustrating a touch system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

In the present disclosure, "connected" or "coupled" may refer to "electrically connected" or "electrically coupled." "Connected" or "coupled" may also refer to operations or actions between two or more elements.

Reference is now made to FIG. 1. FIG. 1 is a schematic diagram illustrating a touch system 100 according to some embodiments of the present disclosure. As illustrated in FIG. 1, the touch system 100 includes a processor 120 and a touch array 140. The processor 120 is coupled to the touch array 140. In some embodiments, the processor 120 includes a control circuit 122 and a processing circuit 124. The control circuit 122 is, for example, a digital controller, but the present disclosure is not limited thereto. The processing circuit 124 is, for example, an embedded processing system, but the present disclosure is not limited thereto. The control circuit 122 may be coupled to the processing circuit 124 through Inter-Integrated Circuit bus (I2C bus) or Universal Serial Bus (USB). In some embodiments, the control circuit 122 is controlled by the processing circuit 124 to output driving signals TS to driving electrodes of the touch array 140 and to receive sensing signals SS from sensing electrodes of the touch array 140. Then, the processing circuit 124 may determine whether a touch event occurs or not according to at least one of the sensing signals SS and determine a touch position according to a position of a corresponding sensing electrode.

Figure 2:
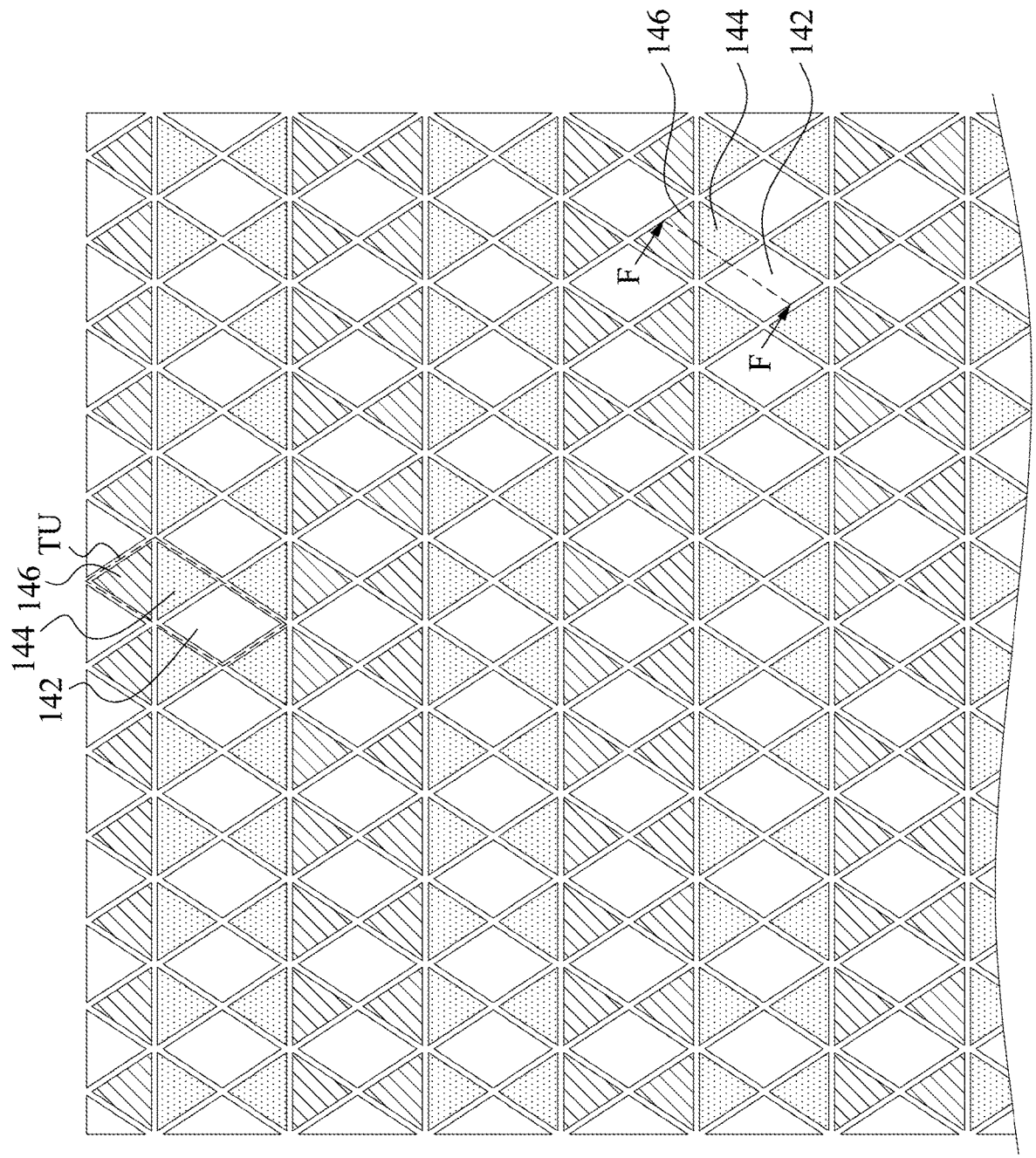
FIG. 2 is a schematic diagram illustrating a touch array in FIG. 1 according to some embodiments of the present disclosure.
Figure 3:
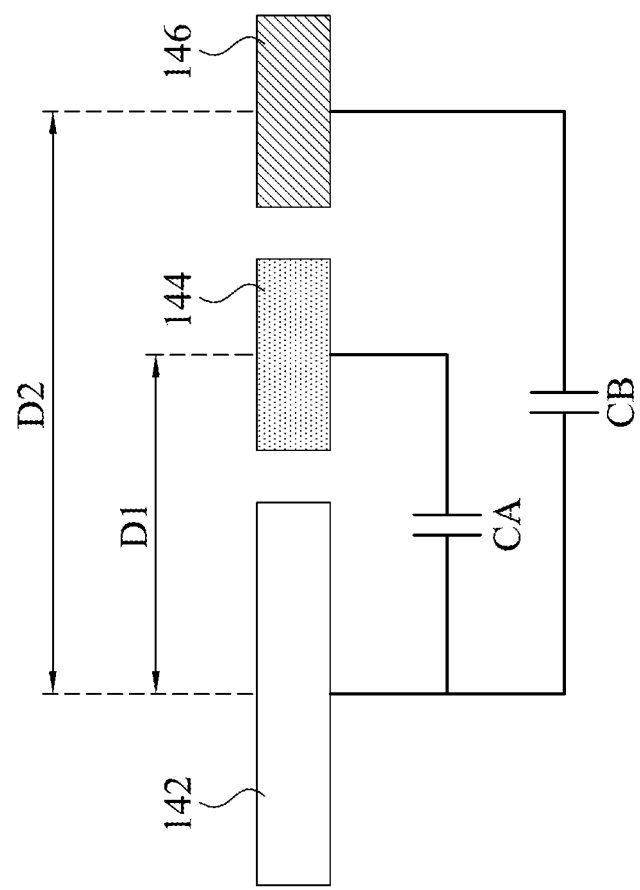
FIG. 3 is a cross-section diagram of a section line FF on the touch array in FIG. 2 according to the some embodiments of the present disclosure.

Reference is now made to FIG. 2. FIG. 2 is a schematic diagram illustrating the touch array 140 in FIG. 1 according to some embodiments of the present disclosure. The touch array 140 includes a plurality of touch units TU. The touch units TU are arranged in a matrix form. Each of the touch units TU includes a driving electrode 142, a sensing electrode 144, and a sensing electrode 146. References are now made to FIG. 2 and FIG. 3. FIG. 3 is a cross-section diagram of a section line FF on the touch array 140 in FIG. 2 according to the some embodiments of the present disclosure. For ease of understanding, the range of the section line FF covers one touch unit TU. As illustrated in FIG. 3, the touch unit TU includes the driving electrode 142, the sensing electrode 144, and the sensing electrode 146. The sensing electrode 144 is disposed between the driving electrode 142 and the sensing electrode 146. Explained in another way, a distance D1 between the driving electrode 142 and the sensing electrode 144 is smaller than a distance D2 between the driving electrode 142 and the sensing electrode 146. A capacitor CA is formed between the driving electrode 142 and the sensing electrode 144. A capacitor CB is formed between the driving electrode 142 and the sensing electrode 146. As described above, the control circuit 122 in FIG. 1 transmits the driving signals TS to the driving electrode 142 in FIG. 3. If a touch object is closing to the touch unit TU, capacitances of the capacitors CA and CB would change and the sensing electrodes 144 and 146 would generate corresponding sensing signals SS. The sensing signals SS are received by the control circuit 122 in FIG. 1, and the processing circuit 124 determines whether a touch event occurs or and determines a touch position according to the received sensing signals SS.

The configurations of the touch units TU in the aforementioned embodiments are given for illustrative purposes only. Various configurations configured to implement the touch units TU are within the contemplated scope of the present disclosure.

Figure 4:
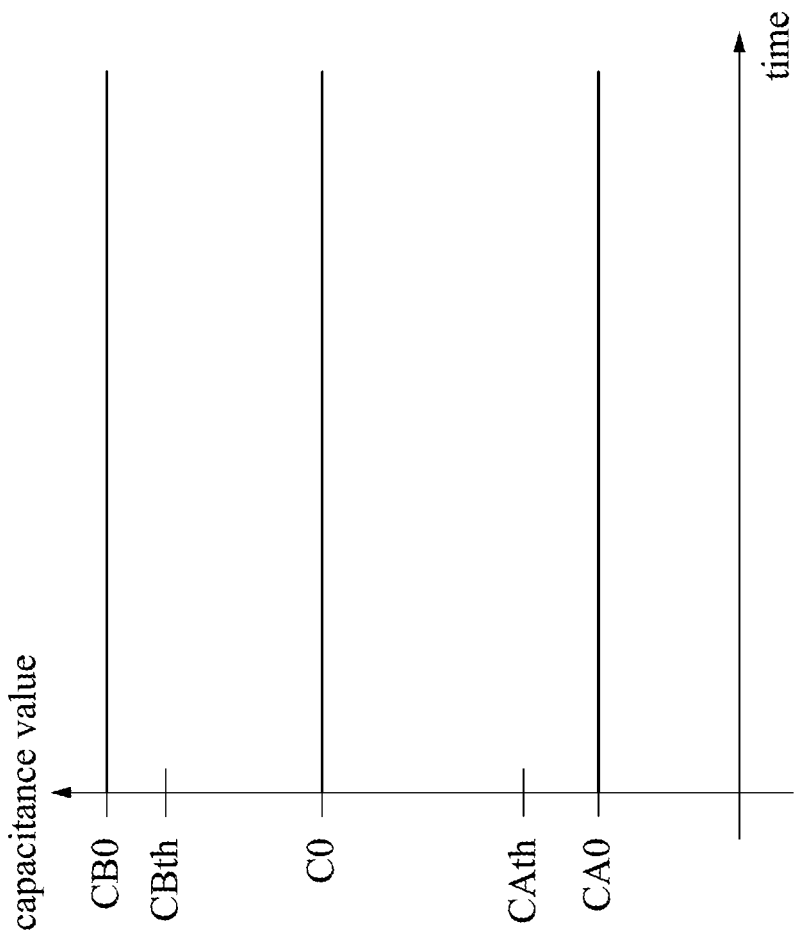
FIG. 4 is a schematic diagram illustrating capacitance values of two capacitors in FIG. 3.

FIG. 4 is a schematic diagram illustrating capacitance values of two capacitors CA and CB in FIG. 3. References are made to FIG. 1, FIG. 3, and FIG. 4. It is noted that, in the present disclosure, an "original capacitance value" of a capacitor is defined to be a capacitance value of the capacitor when the touch object is far away from the touch array 140. As illustrated in FIG. 4, when the touch array 140 is disposed in the air, the original capacitance values of the capacitors CA and CB are C0. However, when the touch array 140 moves from air into water, the original capacitance value of the capacitor CA changes to be CA0 from C0, and the original capacitance value of the capacitor CB changes to be CB0 from C0. Explained in another way, CA0 is the capacitance value of the capacitor CA when the capacitor CA is in the water and the touch object is far away from the touch array 140. CB0 is the capacitance value of the capacitor CB when the capacitor CB is in the water and the touch object is far away from the touch array 140. In other words, when the medium around the touch array 140 is changed to be water from air, the capacitance value of the capacitor CA becomes smaller and the capacitance value of the capacitor CB becomes larger.

In some embodiments, when the original capacitance value of the capacitor CA is smaller than a threshold value CAth and the original capacitance value of the capacitor CB is larger than a threshold value CBth, the processor 120 determines that the touch array 140 operates in an underwater mode. In some embodiments, the threshold value CAth is smaller than the threshold value CBth.

Figure 5:
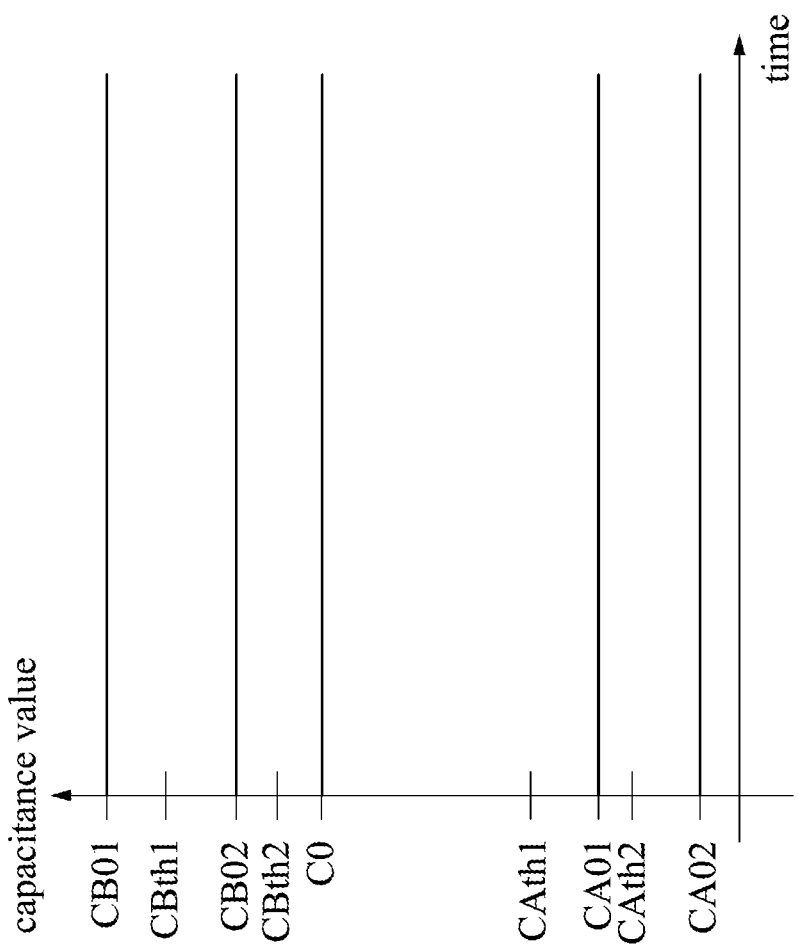
FIG. 5 is a schematic diagram illustrating capacitance values of two capacitors in FIG. 3.

Reference is now made to FIG. 5. FIG. 5 is a schematic diagram illustrating capacitance values of the two capacitors CA and CB in FIG. 3. FIG. 5 illustrates the capacitance values of the capacitor CA and CB in pure water and in salt water. Because conductivities of the pure water and salt water are different, the original capacitance value of the capacitor CA in the pure water is different from the original capacitance value of the capacitor CA in the salt water, and the original capacitance value of the capacitor CB in the pure water is different from the original capacitance value of the capacitor CB in the salt water. As illustrated in FIG. 5, the original capacitance value of the capacitor CA in the pure water is CA01, and the original capacitance value of the capacitor CA in the salt water is CA02. The original capacitance value of the capacitor CB in the pure water is CB01, and the original capacitance value of the capacitor CB in the salt water is CB02.

In some embodiments, when the capacitance value of the capacitor CA is smaller than a threshold value CAth1 and larger than a threshold value CAth2, and the capacitance value of the capacitor CB is larger than a threshold value CBth1, the processor 120 determines that the touch array 140 operates in the underwater mode and determines that the touch array 140 is in the pure water. When the capacitance value of the capacitor CA is smaller than a threshold value CAth2, and the capacitance value of the capacitor CB is larger than a threshold value CBth2 and smaller than a threshold value CBth1, the processor 120 determines that the touch array 140 operates in the underwater mode and determines that the touch array 140 is in the salt water.

Figure 6:
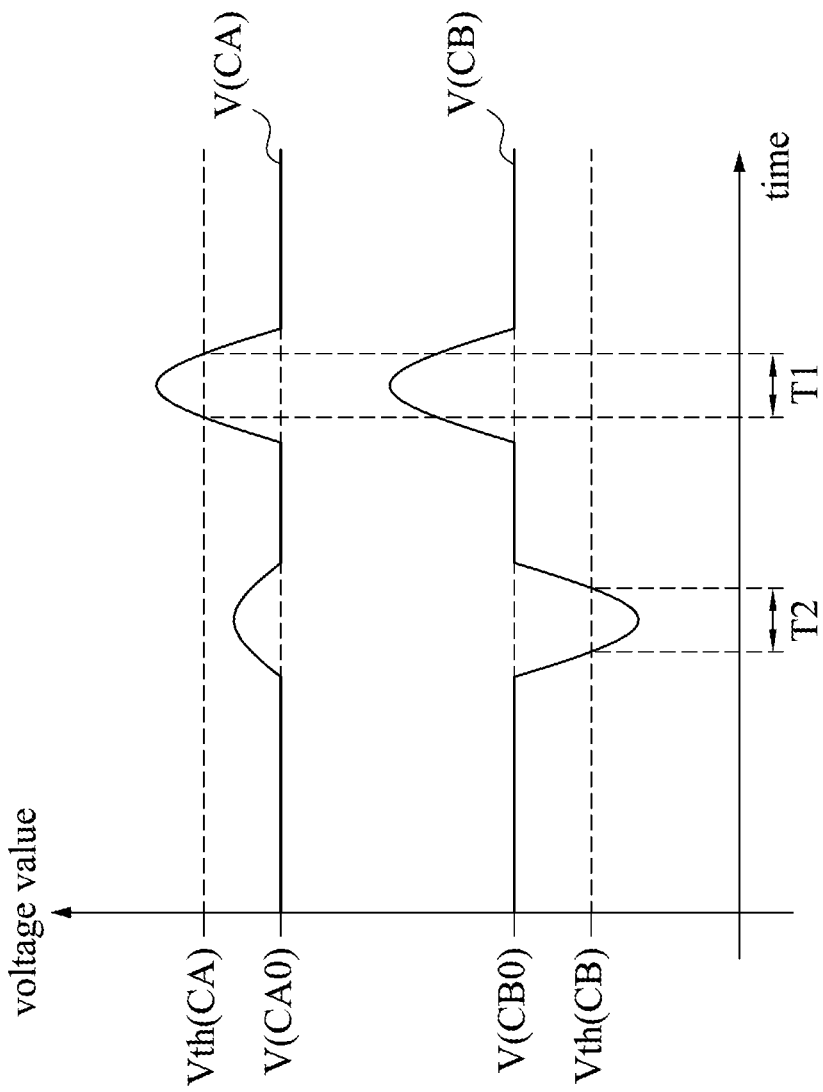
FIG. 6 is a schematic diagram illustrating voltages across two capacitors in FIG. 3.

FIG. 6 is a schematic diagram illustrating voltages across the two capacitors CA and CB in FIG. 3. References are now made to FIG. 1 and FIG. 6. As described above, when the touch array 140 is disposed in the water and the touch object is far away from the touch array 140, the original capacitance value of the capacitor CA is CA0 and the original capacitance value of the capacitor CB is CB0. At this time, the voltage V(CA) across the capacitor CA is V(CA0) and the voltage V(CB) across the capacitor CB is V(CB0). However, when the touch object is closing to the touch array 140, the voltage V(CA) across the capacitor CA and the voltage V(CB) across the capacitor CB would be changed. For example, under a condition that the touch object is a conductor, when the touch object is closing to the touch array 140, the voltage V(CA) across the capacitor CA would become larger and the voltage V(CB) across the capacitor CB would also become larger. Under a condition that the touch object is a non-conductor, when the touch object is closing to the touch array 140, the voltage V(CA) across the capacitor CA would become larger but the voltage V(CB) across the capacitor CB would become smaller. Thus, as illustrated in FIG. 6, when the voltage V(CA) across the capacitor CA is larger than a threshold value Vth(CA) (time duration T1), the processor 120 determines that a conductor touch event occurs. When the voltage V(CB) across the capacitor CB is smaller than a threshold value Vth(CB) (time duration T2), the processor 120 determines that a non-conductor touch event occurs. In some embodiments, the threshold value Vth(CB) is smaller than the threshold value Vth(CA).

Figure 7:
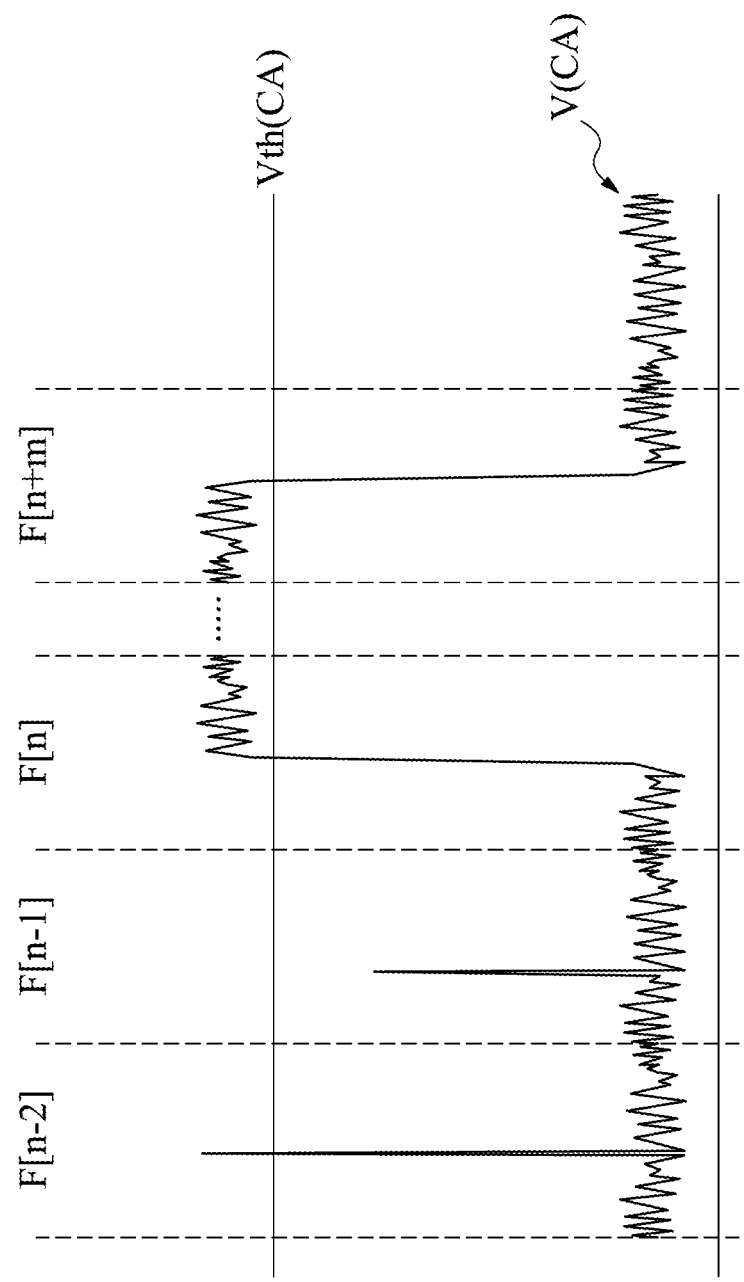
FIG. 7 is a schematic diagram illustrating determining noise according to some embodiments of the present disclosure.

FIG. 7 is a schematic diagram illustrating determining noise according to some embodiments of the present disclosure. References are now made to FIG. 1, FIG. 6 and FIG. 7. In a frame F[n−2], the voltage V(CA) across the capacitor CA is larger than the threshold value Vth(CA) in a short period of time due to noise interference. To avoid interfering diagnosis of the processor 120, the processor 120 determines that the conductor touch event occurs if the voltage V(CA) across the capacitor CA is larger than the threshold value Vth(CA) in a duration and the duration is longer than a threshold time. The threshold time is, for example, m frames. As illustrated in FIG. 7, the duration includes a frame F[n] to a frame F[n+m]. In other words, the duration includes m+1 frames. At this time, the processor 120 determines that the conductor touch event occurs. Similarly, to avoid interfering diagnosis of the processor 120, the processor 120 determines that the non-conductor touch event occurs if the voltage V(CB) across the capacitor CB is smaller than the threshold value Vth(CB) in a duration and the duration is longer than the threshold time.

Figure 8:
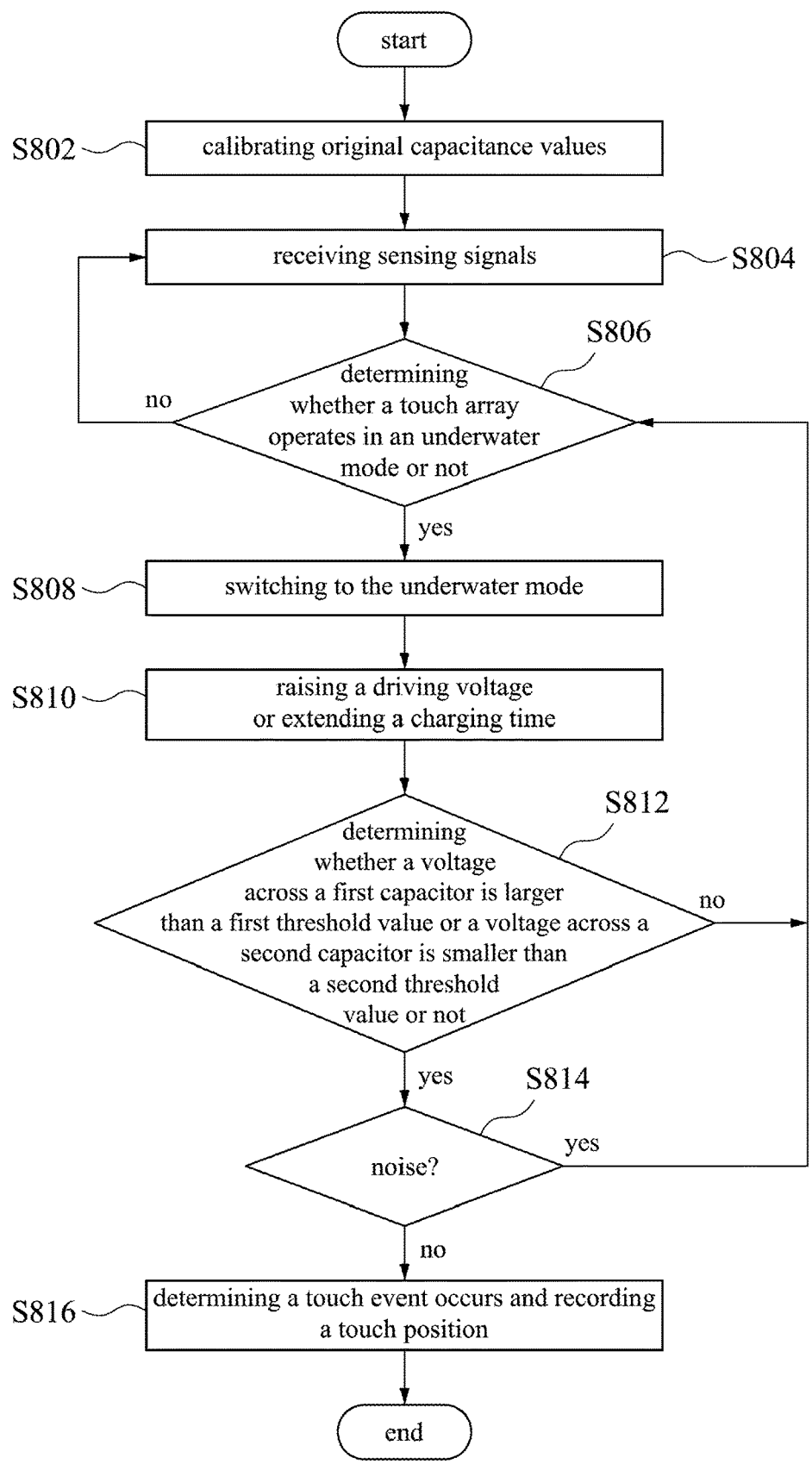
FIG. 8 is a flowchart illustrating an operation method of a touch system according to some embodiments of the present disclosure.

FIG. 8 is a flowchart illustrating an operation method 800 of the touch system 100 according to some embodiments of the present disclosure. In some embodiments, the operation method 800 is implemented in the touch system 100 in FIG. 1, but the present disclosure is not limited thereto. For ease of understanding, the operation method 800 is described with FIGS. 1-6.

Operation S802 is for calibrating the original capacitance value C0. In some embodiments, when the touch array 140 is disposed in the air and the touch object is far away from the touch array 140, the capacitance values of the capacitors CA and CB is calibrated to obtain the original capacitance value C0 of the capacitor CA or CB in the air. After the original capacitance value C0 is calibrated, operation S804 is entered.

Operation S804 is for receiving the sensing signals SS. In some embodiments, the control circuit 122 of the processor 120 receives the sensing signals SS from the sensing electrodes 144 and 146 and performs an analog-digital conversion on the received sensing signals SS. Then, the digitized sensing signals SS are outputted to the processing circuit 124 of the processor 120. Then, operation S806 is entered.

Operation S806 is for determining whether the touch array 140 operates in the underwater mode or not. After the processing circuit 124 receives the digitized sensing signals SS, the original capacitance values of the capacitor CA and the capacitor CB are obtained. If the original capacitance values of the capacitor CA is smaller than the threshold value CAth and the original capacitance values of the capacitor CB is larger than the threshold value CBth, the processor 120 determines that the touch array 140 operates in the underwater mode. Then, operation S808 is entered. If the processor 120 determines that the touch array 140 does not operate in the underwater mode, then back to operation S804

Operation S808 is for switching to the underwater mode. In some embodiments, after the processor 120 determines that the touch array 140 is disposed in the water (operates in the underwater mode), the processor 120 switches to the underwater mode to utilize corresponding algorithm or hardware to determine the touch event occurring in the water and corresponding touch positions. Then, operation S810 is entered.

Operation S810 is for raising a driving voltage of the driving signals TS or extending a charging time of the capacitor CA or the capacitor CB. In some embodiments, after the processor 120 switches to the underwater mode, the processor 120 raises the driving voltage of the driving signals TS or extends the charging time of the capacitor CA or the capacitor CB. Thus, it is beneficial for the processor 120 to sense the voltage V(CA) across the capacitor CA and the voltage V(CB) across the capacitor CB. Then, operation S812 is entered.

Operation S812 is for determining whether the voltage V(CA) across the capacitor CA is larger than the threshold value Vth(CA) or the voltage V(CB) across the capacitor CB is smaller than the threshold value Vth(CB) or not. If yes, operation S814 is entered. If no, back to operation S806. When the voltage V(CA) across the capacitor CA is larger than the threshold value Vth(CA) or the voltage V(CB) across the capacitor CB is smaller than the threshold value Vth(CB), there may be a touch event.

Operation S814 is for determining whether it is noise or not. As described above, the processor 120 determines that it is noise when the voltage V(CA) across the capacitor CA is larger than the threshold value Vth(CA) in a duration or the voltage V(CB) across the capacitor CB is smaller than the threshold value Vth(CB) in the duration, and the duration is shorter than the threshold time. Then, back to operation S806. The processor 120 determines that it is not noise (a touch event occurs) when the voltage V(CA) across the capacitor CA is larger than the threshold value Vth(CA) in a duration or the voltage V(CB) across the capacitor CB is smaller than the threshold value Vth(CB) in the duration, and the duration is longer than the threshold time. Operation S816 is entered.

Operation S816 is for determining the touch event occurs and recording the touch position. If the duration when the voltage V(CA) is larger than the threshold value Vth(CA) is longer than the threshold time, the processor 120 determines that the conductor touch event occurs and records a corresponding touch position. If the duration when the voltage V(CB) is smaller than the threshold value Vth(CB) is longer than the threshold time, the processor 120 determines that the non-conductor touch event occurs and records a corresponding touch position. Thus, related determinations and operations in the water are completed.

The above description of the operation method 800 includes exemplary operations, but the operations of the operation method 800 are not necessarily performed in the order described. The order of the operations of the operation method 800 disclosed in the present disclosure are able to be changed, or the operations are able to be executed simultaneously or partially simultaneously as appropriate, in accordance with the spirit and scope of various embodiments of the present disclosure.

In some embodiments, the operation method 800 may be implemented as a computer program. When the computer program is executed by the processor 120 in FIG. 1, a computer, or an electronic device, this executing device executes the operation method 800. The computer program can be stored in a non-transitory computer readable storage medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains.

As the above embodiments, the touch system and the operation method of the touch system of the present disclosure are able to implement the underwater touch function.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch system, comprising:
a processor; and
a touch array, coupled to the processor, wherein the touch array comprises a plurality of touch units, and each of the touch units comprises:
a driving electrode;
a first sensing electrode, wherein a first capacitor is formed between the first sensing electrode and the driving electrode, and the first capacitor has a first original capacitance value; and
a second sensing electrode, wherein a second capacitor is formed between the second sensing electrode and the driving electrode, and the second capacitor has a second original capacitance value;
wherein the processor is configured to:
determine whether the touch array operates in an underwater mode or not according to a comparison result of the first original capacitance value and a first threshold value and according to a comparison result of the second original capacitance value and a second threshold value, wherein the first threshold value is less than the second threshold value;
determine whether a conductor touch event occurs or not according to a comparison result of a third threshold value and a voltage across the first capacitor when the touch array operates in the underwater mode;
determine whether a non-conductor touch event occurs or not according to a comparison result of a fourth threshold value and a voltage across the second capacitor when the touch array operates in the underwater mode, wherein the fourth threshold value is less than the third threshold value; and
raising a driving voltage of a driving signal provided to the touch array or extending a charging time of the first capacitor or the second capacitor when the touch array operates in the underwater mode.

2. The touch system of claim 1, wherein a first distance between the first sensing electrode and the driving electrode is smaller than a second distance between the second sensing electrode and the driving electrode.

3. The touch system of claim 1, wherein the processor determines that the conductor touch event occurs when the voltage across the first capacitor is larger than the third threshold value.

4. The touch system of claim 3, wherein the processor determines that the conductor touch event occurs if the voltage across the first capacitor is larger than the third threshold value in a duration and the duration is longer than a threshold time.

5. The touch system of claim 1, wherein the processor determines that the non-conductor touch event occurs when the voltage across the second capacitor is smaller than the fourth threshold value.

6. The touch system of claim 5, wherein the processor determines that the non-conductor touch event occurs if the voltage across the second capacitor is smaller than the fourth threshold value in a duration and the duration is longer than a threshold time.

7. An operation method of a touch system, the touch system comprising a touch array, the touch array comprising a plurality of touch units, each of the touch units comprising a driving electrode, a first sensing electrode, and a second electrode, a first capacitor being formed between the first sensing electrode and the driving electrode, the first capacitor having a first original capacitance value, a second capacitor being formed between the second sensing electrode and the driving electrode, the second capacitor having a second original capacitance value, wherein the operation method comprises:
determining, by a processor, whether the touch array operates in an underwater mode or not according to a comparison result of the first original capacitance value and a first threshold value and according to comparison result of the second original capacitance value and a second threshold value, wherein the first threshold value is less than the second threshold value;
determining, by the processor, whether a conductor touch event occurs or not according to a comparison result of a third threshold value and a voltage across the first capacitor when the touch array operates in the underwater mode;
determining, by the processor, whether a non-conductor touch event occurs or not according to a comparison result of a fourth threshold value and a voltage across the second capacitor when the touch array operates in the underwater mode, wherein the fourth threshold value is less than the third threshold value; and
raising a driving voltage of a driving signal provided to the touch array or extending a charging time of the first capacitor or the second capacitor by the processor when the touch array operates in the underwater mode.

8. The operation method of claim 7, wherein a first distance between the first sensing electrode and the driving electrode is smaller than a second distance between the second sensing electrode and the driving electrode.

9. The operation method of claim 7, further comprising:
determining, by the processor, the conductor touch event occurs when the voltage across the first capacitor is larger than the t first threshold value.

10. The operation method of claim 9, wherein the processor determines that the conductor touch event occurs if the voltage across the first capacitor is larger than the third threshold value in a duration and the duration is longer than a threshold time.

11. The operation method of claim 7, further comprising:
determining, by the processor, the non-conductor touch event occurs when the voltage across the second capacitor is smaller than the fourth threshold value.

12. The operation method of claim 11, wherein the processor determines that the non-conductor touch event occurs if the voltage across the second capacitor is smaller than the fourth threshold value in a duration and the duration is longer than a threshold time.

13. A non-transitory computer readable storage medium storing one or more programs, wherein the one or more programs comprise instructions, a processor of a touch system is configured to execute the instructions, the touch system comprises a touch array, the touch array comprises a plurality of touch units, each of touch units comprises a driving electrode, a first sensing electrode, and a second sensing electrode, a first capacitor is formed between the first sensing electrode and the driving electrode, the first capacitor has a first original capacitance value, a second capacitor is formed between the second sensing electrode and the driving electrode, the second capacitor has a second original capacitance value, and when the processor executes the instructions, the processor executes following steps:

determining whether the touch array operates in an underwater mode or not according to a comparison result of the first original capacitance value and a first threshold value and according to a comparison result of the second original capacitance value and a second threshold value, wherein the first threshold value is less than the second threshold value;

determining whether a conductor touch event occurs or not according to comparison result of a third threshold value and a voltage across the first capacitor when the touch array operates in the underwater mode;

determining whether a non-conductor touch event occurs or not according to a comparison result of a fourth threshold value and a voltage across the second capacitor when the touch array operates in the underwater mode, wherein the fourth threshold value is less than the third threshold value; and raising a driving voltage of a driving signal provided to the touch array or extending a charging time of the first capacitor or the second capacitor when the touch array operates in the underwater mode.

* * * * *